Sept. 1, 1936. H. F. MARSHALL 2,052,719
HEATING RISER
Filed May 17, 1935
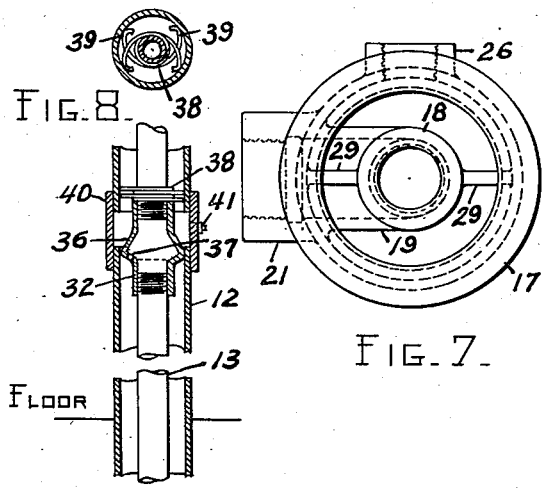
FIG. 8.
FIG. 7.
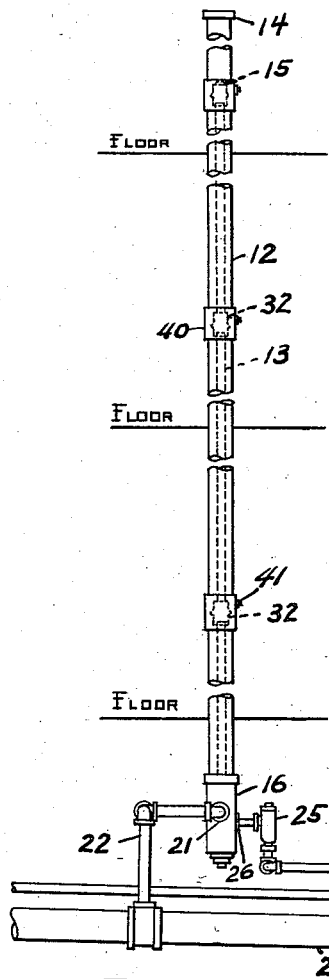
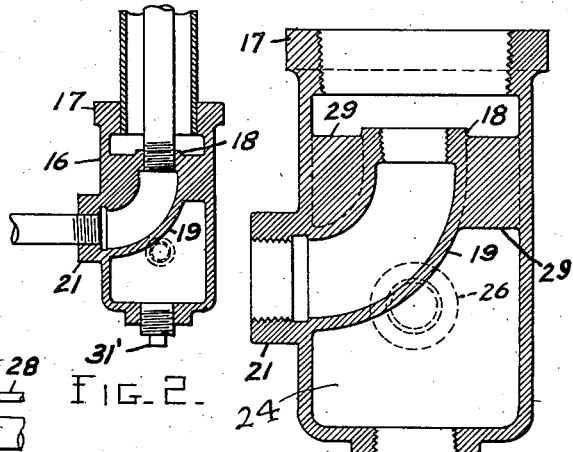
FIG. 2.
FIG. 6.
FIG. 1.
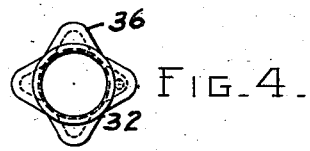
FIG. 4.
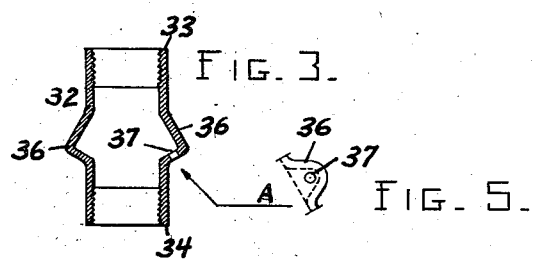
FIG. 3.
FIG. 5.
INVENTOR
HAROLD F. MARSHALL
BY
ATTORNEY Patented Sept. 1, 1936

2,052,719

UNITED STATES PATENT OFFICE 2,052,719

HEATING RISER

Harold F. Marshall, Palmyra, N. J., assignor to Warren Webster & Company, Camden, N. J., a corporation of New Jersey Application May 17, 1935, Serial No. 21,935

11 Claims. (Cl. 257—254)

This invention relates to heating systems and has particular reference to systems employing heating risers.

It has been the practice for many years in many installations to depend upon the heat delivered from exposed supply pipes to supplement the heat delivered by radiators to supply sufficient heat for the requirements. These supply pipes are known as "heating risers".

Heating risers are also frequently run vertically through small rooms such as bath rooms, kitchens, elevators shafts and the like as the sole means of heating these spaces, thus avoiding the added expense of installing small radiators and their necessary connections.

Present day systems effectively control the steam delivery to radiators by means of the combination of orifices installed at the entrance to the radiators and central pressure control means which will vary the pressure difference across these orifices.

In installations where heating risers are employed, they are frequently found to represent a substantial portion of the total heating load, ranging sometimes as high as 35 per cent of the total load. Consequently, installations of this nature having large heating riser loads constituted a special problem because the possibility of effecting steam savings through the use of controlled systems was materially curtailed, the heating riser portion of the load being uncontrollable.

One object of the present invention is to provide a heat unit to replace so-called heating risers retaining the simplicity and other advantages of the heat riser by occupying very limited space and embodying all the advantages of control referred to in the preceding paragraph.

A further object of the present invention is to provide a controllable heating riser.

Another object is to provide a heating riser in which steam delivery can be modified by change of pressure differential where pressure differential controls are employed, or in frequency or length of pulsation where pulsating flow control is employed.

Still another object is to provide a heating riser where the necessity for top venting is eliminated, thus making it possible to locate both supply and return connections at the base of the riser.

According to the invention the heating riser comprises the outer radiating tube, an inner tube connecting the steam supply, and means located at desired points in said inner tube to inject steam from said inner tube to said outer tube. The means employed may be in the form of couplings having orifices for discharging steam into the outer tube, and said couplings may be equipped with means for maintaining the inner tube at the center of the outer tube, and so designed that the condensation may descend to the bottom of the outer tube. The upper ends of the tubes may be plugged, thereby eliminating the necessity of return connections.

The drawing illustrates an embodiment of the invention and the views therein are as follows:

Fig. 1 is a side elevation of the heating riser system with sections broken out.

Fig. 2 is an enlarged vertical sectional view of the bottom of the riser and shows the fitting employed for admitting steam to the inner tube and for disposing of condensation from the outer tube.

Fig. 3 is a vertical sectional view of the coupling employed.

Fig. 4 is a top plan view of the same.

Fig. 5 is a small detail looking in the direction of the arrow A.

Fig. 6 is an enlarged vertical sectional view of the fitting employed at the bottom of the riser.

Fig. 7 is a top plan view of the same.

Fig. 8 is a cross sectional view of the riser showing the steadying springs for permitting chattering.

Referring to Fig. 1 the riser, comprising an outer radiating tube 12 and an inner steam tube 13, extends through successive floors of a building and the upper ends of same are capped as at 14 and 15 respectively.

The lower ends of both tubes are held in a fitting 16, the lower end of the outer tube 12 being screwed into the threaded collar 17, and the lower end of the inner tube 13 being screwed into the central threaded neck 18.

This central neck is the terminus of an elbow 19 whose lower end extends to the threaded boss 21 on the side of the fitting.

Pipe fittings 22 extend from the steam supply main 23 and into the threaded boss 21.

Surrounding the elbow 19 in the fitting 16 is a well or sump 24 which has an outlet through the boss 26. This outlet is fitted with a thermostatic trap 25 included in the usual drain equipment 27 leading to a return or waste pipe 28. The fitting 16 has strengthening ribs 29 extending between the elbow and the side walls thereof while the lower end of said fitting has a boss 31 threaded to receive a plug 31', which may be removed for cleansing the well or sump.

At a suitable distance above each floor of the building the inner steam tube 13 is provided with a coupling 32 which is shown in detail in Figs. 3 to 5. Intermediate its threaded ends 33 and 34 the coupling has a series of outwardly flaring elbows 36, one or more of which is drilled to provide an orifice 37.

These flaring elbows 36 retain the inner steam tube 13 centrally of the outer radiating tube while springs 38, preferably of phosphor bronze, encircle the inner tube and their arcuate ends 39 engage the inner walls of the outer tube. These springs prevent any chattering of the couplings against the outer tube.

The outer tube has the ends of its sections secured in couplings 40, each of which is provided with a threaded hole for receiving a pipe plug 41 which may be removed for excluding excess air from the tube. Steam under pressure is admitted from the supply main 23 from which it passes through the pipes 22 and elbow 19 in the fitting 16 and into the inner tube 13. The air in said tube is forced through the orifices 37 of the couplings 32 so that said tube is completely filled with steam.

The steam passes through the orifices 37 and is directed downward by the pressure of same and it thus surrounds the inner tube both below and above the coupling 32, heating a section of the outer radiating tube 12.

The length of the heated section of the outer radiating tube will be directly controlled by the pressure of the steam, thereby providing a tubular radiator controllable from the same equipment employed for controlling the main radiators of the building.

The air in the outer tube will of course be forced into the sections of the outer tube between the heated areas, and the condensation which is free to pass the several couplings 32 will descend into the well or sump 24 from which it is removed through the thermostatic trap 25 and the pipes 27 into the return pipe 28.

Some of the air in the outer tube will also descend and be carried off through the return pipe, and the condensation will carry some of it downward.

The level of condensation in the well 24 is fixed by the outlet in the boss 26 and is just below the lowest wall of the elbow 19.

It will be self-evident that the special coupling shown in Figs. 3, 4 and 5 may be omitted and holes drilled in the wall of the inner tube 13. These holes may be oblique so as to direct the steam downward or in any desired direction.

Of course the heating riser, couplings and fittings may be modified and changed in various ways without departing from the invention herein set forth and hereafter claimed.

The invention is hereby claimed as follows:

1. A riser for a heating system, said riser comprising an outer radiating tube, an inner tube connecting a source of steam supply, couplings with orifices in said inner tube for delivering steam from said tube to said riser to heat sections adjacent said couplings, and springs surrounding the inner tube and engaging the outer tube to prevent chattering between the couplings and said outer tube.

2. A heating riser comprising an inner and an outer tube, couplings with orifices in said inner tube for admitting steam from the inner to the outer tube, a fitting providing means for attachment to a supply main for admitting steam to the inner tube, and a well for collecting the condensation from the outer tube.

3. A heating riser comprising an inner and an outer tube, couplings with orifices in said inner tube for admitting steam from the inner to the outer tube, a fitting providing means for attachment to a supply main for admitting steam to the inner tube, a well for collecting the condensation from the outer tube, and means for attachment to a return pipe whereby the condensation is removed from said well.

4. A heating riser comprising an inner and an outer tube, couplings with orifices in said inner tube for admitting steam from the inner to the outer tube, means for preventing chattering between the couplings and said outer tube, a fitting providing means for attachment to a supply main for admitting steam to the inner tube, and a well for collecting the condensation from the outer tube.

5. A heating riser comprising an inner and an outer tube, couplings with orifices in said inner tube for admitting steam from the inner to the outer tube, means for preventing chattering between the couplings and said outer tube, a fitting providing means for attachment to a supply main for admitting steam to the inner tube, a well for collecting the condensation from the outer tube, and means for attachment to a return pipe whereby the condensation is removed from said well.

6. A coupling for heat risers having an inner steam tube and an outer radiating tube, said coupling having means for attachment to the ends of successive sections of the inner tube, means on the coupling for centering the inner tube in the outer tube when the coupling is installed in the inner tube, and an orifice in said coupling for delivering steam downwardly into the outer tube.

7. A multiple level riser for a controlled heating system, said riser comprising an unobstructed outer radiator tube extending continuously through said levels, an inner tube connected to a source of steam supply and being substantially coextensive with said outer tube, and one or more orifices in said inner tube for each level, whereby pressure regulation will deliver varying quantities of steam from the inner to the outer tube to heat predetermined sections of said outer tube.

8. A multiple level riser for a controlled heating system, said riser comprising an unobstructed outer radiator tube extending continuously through said levels, an inner tube connected to a source of steam supply and being substantially coextensive with said outer tube, one or more orifices in said inner tube for each level, whereby pressure regulation will deliver varying quantities of steam from the inner to the outer tube to heat predetermined sections of said outer tube, and means for centering the inner tube in the outer tube.

9. A multiple level riser for a controlled heating system, said riser comprising an unobstructed outer radiator tube extending continuously through said levels, an inner tube connected to a source of steam supply and being substantially co-extensive with said outer tube, one or more orifices in said inner tube for each level, whereby pressure regulation will deliver varying quantities of steam from the inner to the outer tube to heat predetermined sections of said outer tube, and springs surrounding said inner tube and engaging said outer tube for centering the inner tube in the outer tube.

10. A multiple level riser for a controlled steam heating system in which steam is delivered continuously, said riser comprising an outer radiator tube extending continuously through said levels, an inner tube connected to a source of steam supply and being substantially co-extensive with said outer tube, the space between said tubes being substantially unobstructed so that the condensate from the different levels may pass downward through said space, orifices in the inner tube at predetermined locations for heating the desired levels, and means for draining the condensate from the riser.

11. A multiple level riser for a controlled steam heating system in which steam is delivered continuously, said riser comprising an outer radiator tube extending continuously through said levels, an inner tube connected to a source of steam supply and being substantially co-extensive with said outer tube, the space between said tubes being substantially unobstructed so that the condensate from the different levels may pass downward through said space, orifices in the inner tube at predetermined locations for heating the desired levels, and a fitting for said tubes and through which steam is admitted to the inner tube and the condensate drained from the outer tube.

HAROLD F. MARSHALL.